United States Patent [19]

Christodoulou

[11] Patent Number: 4,643,086
[45] Date of Patent: Feb. 17, 1987

[54] APPARATUS FOR THE MECHANICAL TREATMENT OF FOOD PRODUCT

[75] Inventor: Spiros Christodoulou, Hertfordshire, United Kingdom

[73] Assignee: Din Engineering Limited, Bedfordshire, United Kingdom

[21] Appl. No.: 658,437

[22] Filed: Oct. 5, 1984

[30] Foreign Application Priority Data

Jul. 16, 1984 [GB] United Kingdom ............... 8418058

[51] Int. Cl.⁴ ............................................. A23N 5/01
[52] U.S. Cl. ....................................... 99/574; 99/580; 99/610; 99/613; 99/621; 221/201
[58] Field of Search ................ 99/518, 519, 520, 568, 99/524, 600, 609–611, 612–615, 617, 621, 574, 580; 221/201; 426/481, 482

[56] References Cited

U.S. PATENT DOCUMENTS

| 989,421 | 4/1911 | Reinhardt | 99/613 |
| 3,298,564 | 1/1967 | Wheatley et al. | 221/201 |
| 4,432,275 | 2/1984 | Zekert et al. | 99/621 X |

Primary Examiner—Timothy F. Simone
Attorney, Agent, or Firm—Birch, Stewart, Kolasch & Birch

[57] ABSTRACT

An oscillating deck for treatment of a product such as peanuts is mounted on a main frame by air mounts. The deck is driven in linear oscillation by a pair of vibration motors. The deck supports a cascade of conveying surfaces which deliver the product to treatment stages such as rollers and debris removal devices; the treatment stages being mounted independently of the deck.

7 Claims, 2 Drawing Figures

FIG. I.

APPARATUS FOR THE MECHANICAL TREATMENT OF FOOD PRODUCT

BACKGROUND TO THE INVENTION

The present invention relates to an oscillating deck particularly for use in the treatment of a product such as peanuts. The deck also has other applications in relation to other products.

The purpose of the deck is to support the product and to convey the product past one or more treatment stages.

In the processing of peanuts for use in food products such as peanut-butter or confectionery bars etc., it is often required to remove the outer husk from pre-shelled peanuts, to break the peanut into two halves, and to remove the germ.

This process has been previously carried out by conveying the peanuts along a series of inclined and oscillated decks which serve to singulate the flow of peanuts and to deliver a steady stream of peanuts to be passed between the nips of transversely mounted rollers. In the past each deck has consisted of a single inclined surface driven in oscillation by an eccentric drive mounted on the main frame of apparatus concerned. Prior art apparatus of this kind has been very bulky, has been inefficient in terms of durability and energy expenditure, and is unsuitable for high frequency oscillations.

SUMMARY

The present invention overcomes the disadvantages of the prior art by the use of a monocoque deck comprising at least two flat conveying surfaces arranged in series wherein the deck is mounted on a frame by means of air mounts and wherein the deck is driven in oscillation by one or more out-of-balance motors mounted on the deck.

DETAILED DESCRIPTION OF AN EMBODIMENT OF THE INVENTION

Figure 1:
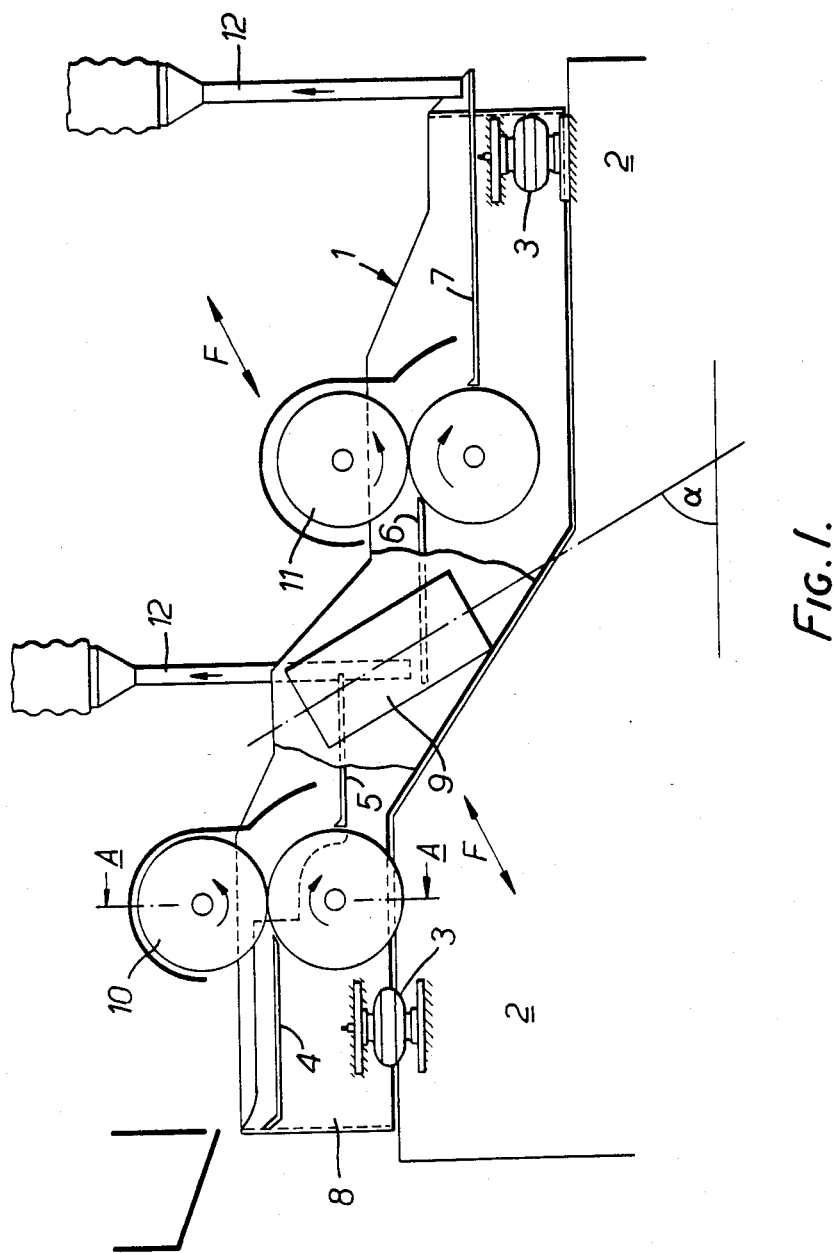
FIG. 1 shows a longitudinal section through a deck mounted on a frame and provided with associated treatment stages.

As shown in the drawings, a deck 1 is mounted on a main frame 2 by means of air mounts 3. The deck comprises four flat conveying surfaces 4–7 which are paralled and horizontal when the deck is mounted as shown. The conveying surfaces 4–7 are in series and are each arranged at sequentially lower levels forming a cascade.

The conveying surfaces are mounted between side plates 8, and the subframe thus formed is strengthened by transverse beams and plates (not shown). Mounted on either side of the deck are out-of-balance vibration motors 9 which impart a linear oscillatory motion to the deck in the direction shown by the arrows F. The motors 9 are shown only diagrammatically in the drawing.

Product such as peanuts to be treated are delivered to the first conveying surface 4 from a supply. By virtue of the horizontal component of the oscillation, the peanuts are conveyed along the surfaces 4–7 in turn. Several treatment stages may be arranged between adjacent surfaces. As shown in FIG. 1, the first conveying surface 4 delivers material to the nip between a pair of resilient rollers 10. The oscillation of the deck causes the peanuts to singulate and to be delivered end-on to the nip. The level of the first conveying surface 4 is in fact slightly below the level of the nip so that the product is picked up by the lower roller from the conveying surface. The rollers are carefully spaced to apply a controlled squeezing force to the peanuts which tends to break off the husk, to separate the two halves of the peanut and to detach the germ. The surface 5 is arranged roughly on a level with the axis of the lower roller. This positioning of the surface 5 allows product to be thrown from the rollers onto the surface and avoids the build up of material between the lower roller and the upstream edge of the conveying surface 5. The surfaces 5, 6 and 7 may be perforated to allow meal and debris to fall therethrough. Peanuts are also arranged to fall from surface 5 to surface 6 through an air curtain which is connected by tubing 12 to a suction pump for the removal of lighter materials such as the husk. A second pair of rollers 11 which are more closely spaced provides for the separation of the more stubborn peanuts. Finally a further suction removal device is provided at the outlet end of the conveying surface 7. The air mounts 3 comprise rubber cylinders which can be inflated by compressed air.

The various treatment stages are not mounted on the deck and so are not subjected to the vibrations. The angle at which the motors 9 are mounted may be adjusted to vary the plane of oscillation of the deck. Typically the angle will be between 45° and 70°. The amplitude of the oscillations is typically about 2–3 mm and the frequency from 1000–3000 cycles/minute. The speed of material along the deck will typically be about 20 m/minute.

Figure 2:
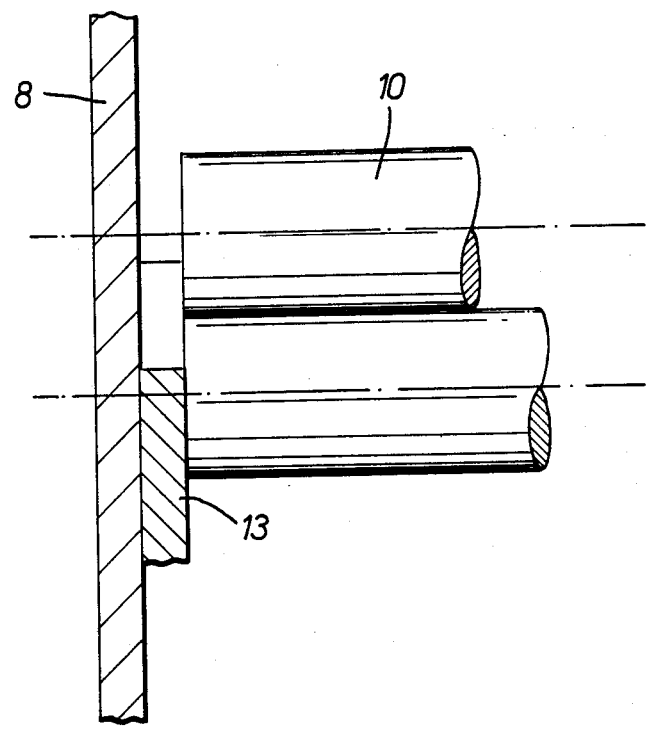
FIG. 2 shows a detail of the deck on a different scale.

As shown in FIG. 2, the ends of the rollers are spaced slightly, say 3 cm, from the side plates 8, and a guide wall 13, emergent from each side plate prevents peanuts being caught between the inlet side of the rollers 10 and the side plates. This wall 13 drops away at the point where peanuts are gripped by the rollers so that no peanuts are squeezed between the rollers and the wall. Some peanuts may be thrown out by the rollers into the space provided where the wall drops away, and these peanuts will fall under gravity onto the next conveying surface 5. The arrangement described above avoids the need for the extreme end portions of the rollers to be blanked-off. Consequently the complete width of the rollers is used and wear of the rollers is completely even right across their width. This enables adjustment of the spacing between the rollers to be made without creating zones of unequal spacing at the ends of the rollers.

I claim:

1. An apparatus for the treatment of a product such as peanuts which comprises:
    a main frame;
    a plurality of air mounts;
    a subframe supported on the main frame by said air mounts;
    at least one vibration motor mounted on the subframe for driving the subframe in an oscillating motion relative to the main frame;
    a plurality of substantially horizontal product conveying surfaces mounted on the subframe and arranged in a cascading series wherein each of the conveying surfaces is mounted at a lower level on the subframe than the preceding conveying surface;

at least one pair of resilient rotating rollers mounted on the main frame independently of the subframe, said rollers being arranged with their axes substantially horizontal and spaced such that a nip is formed between each pair of rollers through which the product can pass;

the arrangement being such that the product is delivered to the nip between the pair of rollers from a respective one of said conveying surfaces.

2. The apparatus of claim 1 wherein the air mounts comprise rubber cylinders which are inflated with compressed air.

3. The apparatus according to claim 1, wherein the subframe is provided with a pair of side plates each of which supports a respective vibration motor.

4. The apparatus according to claim 3, wherein the vibration motors are mounted on the subframe with their axes at an angle of 45°–70° to the planes of the conveying surfaces.

5. The apparatus according to claim 3, wherein the vibration motors cause the subframe to vibrate in linear oscillation at a frequency of 1000–3000 cycles/minute.

6. The apparatus according to claim 5, wherein the amplitude of the oscillations is in the range of 2–3 mm.

7. The apparatus according to claim 1, further comprising means for providing a substantially vertical air curtain at the downstream end of at least one of the conveying surfaces such that air borne debris can be removed from the product.

* * * * *